United States Patent
Parvaresh et al.

(10) Patent No.: US 9,172,928 B2
(45) Date of Patent: Oct. 27, 2015

(54) COLOR IMAGE CAPTURE SYSTEM AND METHOD FOR LIGHT MODULATION

(75) Inventors: Farzad Parvaresh, Menlo Park, CA (US); Andrew J Patti, Cupertino, CA (US); Ramin Samadani, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/346,440

(22) PCT Filed: Oct. 21, 2011

(86) PCT No.: PCT/US2011/057400
§ 371 (c)(1), (2), (4) Date: Mar. 21, 2014

(87) PCT Pub. No.: WO2013/058777
PCT Pub. Date: Apr. 25, 2013

(65) Prior Publication Data
US 2014/0226044 A1    Aug. 14, 2014

(51) Int. Cl.
| | |
|---|---|
| H04N 5/335 | (2011.01) |
| H04N 9/04 | (2006.01) |
| H04N 3/14 | (2006.01) |
| H04N 9/083 | (2006.01) |
| H04N 5/225 | (2006.01) |

(52) U.S. Cl.
CPC ............. H04N 9/083 (2013.01); H04N 5/2254 (2013.01); H04N 9/045 (2013.01)

(58) Field of Classification Search
CPC ...... H04N 9/083; H04N 5/2254; H04N 9/045
USPC .................................... 348/272–276
IPC .................. H04N 5/225,5/2251, 5/2254, 5/246, H04N 5/247
See application file for complete search history.

(56) References Cited

U.S. PATENT DOCUMENTS

| | | |
|---|---|---|
| 7,949,252 B1 | 5/2011 | Georgiev |
| 2010/0003024 A1 | 1/2010 | Agrawal et al. |
| 2010/0194926 A1 | 8/2010 | Kang et al. |
| 2010/0200730 A1* | 8/2010 | Yukawa ..................... 250/208.1 |
| 2010/0265386 A1 | 10/2010 | Raskar et al. |

(Continued)

OTHER PUBLICATIONS

International Preliminary Report on Patentability, May 1, 2014, The International Bureau of WIPO, PCT Patent Application No. PCT/US2011/057400.

(Continued)

*Primary Examiner* — Yogesh Aggarwal
(74) *Attorney, Agent, or Firm* — HP Legal Department (57) ABSTRACT

A color image capture systems comprised of: a lens 110; a light sensitive sensor 114; a first wavelength dependent mask 120 located on an optical path 128 between the lens and sensor, wherein the first wavelength dependent mask 120 includes a first attenuation pattern for modulation of a light field; and a second wavelength dependent mask 130, wherein the second wavelength dependent mask includes a second attenuation pattern to modulate the modulated light field from the first wavelength dependent mask, the second wavelength dependent mask located on the optical path 128 between the first wavelength dependent mask and the sensor, further wherein the second wavelength dependent mask is separated from the sensor by a distance d.

9 Claims, 7 Drawing Sheets

(56) References Cited

U.S. PATENT DOCUMENTS

2011/0032337 A1 2/2011 Rodríguez et al.
2011/0211824 A1 9/2011 Georgiev et al.

OTHER PUBLICATIONS

International Search Report and Written Opinion, May 4, 2012, PCT Application No. PCT/US2011/057400.

Lumsdaine et al., The Focused Plenoptic Camera, Proceedins IEEE ICO, 2009, pp. 1-8.

Veeraraghaven et al., Dappled Photography: Mask Enhacnces Cameras for Heterodyned Light Fields and Coded Aperture Refocusing, ACM Transactiions on Graphics, vol. 26, No. 3, Article 69, Jul. 2007, pp. 1-12.

* cited by examiner

COLOR IMAGE CAPTURE SYSTEM AND METHOD FOR LIGHT MODULATION

CROSS-REFERENCE TO RELATED APPLICATION

This application is a U.S. National Stage Application of and claims priority to International Patent Application No. PCT/US2011/057400, filed on Oct. 21, 2011, and entitled "COLOR IMAGE CAPTURE SYSTEM AND METHOD FOR LIGHT MODULATION".

BACKGROUND

Plenoptic cameras may be implemented using micro-lens arrays. Unfortunately, micro-lens arrays can be expensive and if color images are desirable, the plenoptic camera can also require a color filter array. Color plenoptic cameras may also be implemented using a gray mask with broadband absorption in addition to a color filter array. However, the lowered light transmission associated with color filter arrays have made mask-based plenoptic cameras less attractive to digital camera designers.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

Many currently available digital cameras output a 2D image that contains no information about the directional distribution of the light that strikes the camera's sensor. Plenoptic cameras which have the ability to extract angular information (i.e. angle of the light direction, angular resolution, etc.) from a light field, provide new capabilities not available from digital cameras that do not have this ability. Included in this list of additional new capabilities are: the ability to change the focal depth after a picture has been taken, the ability to obtain a depth map, and the ability to create a high depth-of-field picture with a larger aperture (lower noise) than would otherwise be possible.

Although plenoptic imaging systems provide advanced capabilities, the ability to provide color images is often at a cost—the addition of a color filter array. The presence of the color filter array both reduces the overall light transmission and requires a sophisticated demosaicing algorithm to be implemented to recover the full color picture. The result is a signal-to-noise (SNR) reduction as less light is available at the sensor.

We describe a image capture system and method that involves the use of at least two spatially modulated and wavelength dependent masks, which are located at two (or more) positions in the imaging system. The placement and patterns of the at least two color-dependent modulated masks provides the angular information needed for plenoptic system while simultaneously eliminating the need for a color filter array. Performing the functions of providing angular resolution and color separation, the combination of the at least two wavelength subtractive masks allows the color filter array used in color imaging to be removed while still providing plenoptic functions. An advantage to our approach is that the signal to noise ratio is significantly increased making our approach attractive for plenoptic camera design. Further, because demosaicing is not required, the computational requirements of the imaging system for color filtering of the light field are anticipated to be reduced.

Figure 1:
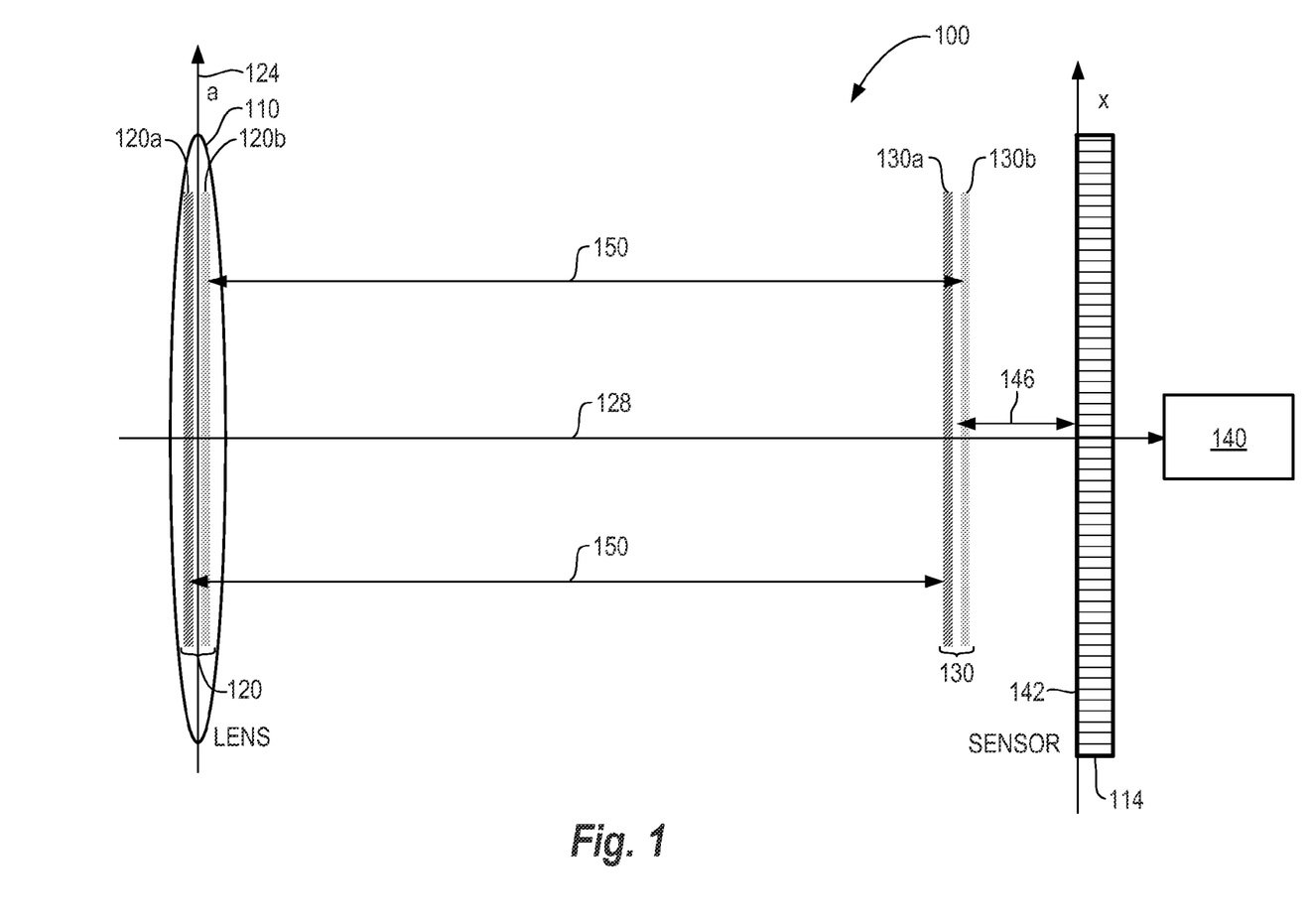
FIG. 1 illustrates a schematic diagram of a color image capture system for modulating a light field without using a color filter array according to an example of the invention.

FIG. 1 illustrates a schematic diagram of a color image capture system 100 that does not utilize a color filter array to generate color images according to an example of the invention. Referring to FIG. 1 shows a color image capture systems comprised of: a lens 110; a light sensitive sensor 114; a first wavelength dependent mask 120 located on an optical path 128 between the lens and sensor, wherein the first wavelength dependent mask 120 includes a first attenuation pattern for modulation of a light field; and a second wavelength dependent mask 130, wherein the second wavelength dependent mask includes a second attenuation pattern to modulate the modulated light field from the first wavelength dependent mask, the second wavelength dependent mask located on the optical path 128 between the first wavelength dependent mask and the sensor, further wherein the second wavelength dependent mask is separated from the sensor by a distance d.

Referring to FIG. 1 includes a lens 110. For discussion purposes, the lens 110 is shown as a single lens. However, the lens may be comprised of, for example, a plurality of lens elements. The lens 110 is positioned along an optical path that is terminated by a light sensitive sensor 114 for collecting data regarding the light field that has been modulated by at least two wavelength dependent masks also positioned in the optical path.

For purposes of discussion, the first wavelength dependent mask 120 is shown in FIG. 1 positioned at the principal plane although the principal plane may be located at other locations along the optical path. The first wavelength dependent mask 120 is positioned along the optical path in the principal plane 124 of the lens. The second wavelength dependent mask 130 also is positioned along the optical path. The second wavelength dependent mask is positioned so that it is a distance d 146 from the sensor. The distance d (i.e., 146) is not equal to zero (lens does not abut the sensor) and should be sufficient to ensure that the angular information regarding the light field can be derived.

The imaging system includes a light sensitive sensor, such as a charge coupled device (CCD) to capture the modulated light. Using knowledge of the imaging system 100 (the mask patterns, distance between the lens, etc.), information from the captured modulated light scene is processed by a computing device 140 to form a digital image. The computing device 140 is communicatively coupled to the to the light sensitive sensor.

Referring to FIG. 1, it can be seen that the surface of both the first and second wavelength dependent masks 120, 130 are separated a physical distance from the surface 142 of the sensor 114. This is in contrast to the physical placement of color filter arrays which are often positioned to abut or otherwise be in physical contact with the sensor. The goal of the color filter array is to make each individual pixel on the CCD sensor only capable of accepting light from one particular color. This is in contrast to the imaging system 100, where each pixel is capable of seeing color from the entire light spectrum of the scene. Now the light spectrum is modulated—is a function of the at least first and second wavelength dependent masks that are placed in front of the sensor.

The color image system 100 includes at least two masks: a first wavelength dependent mask 120 and a second wavelength dependent mask 130, both positioned along the optical path in the principal plane of the lens. Although two masks are shown in the implementation shown in FIG. 1, in one example more than two masks may be used to implement the goals of the color image capture system 100.

One of the goals of the color image capture system is to eliminate the color filter array (often a Bayer filter) found in many color image systems—while still providing a color digital image of the captured scene. The color image system 100 provides the color information using a combination of at least two wavelength dependent masks, instead of using a color filter array. FIGS. 2B and 2C both show the resulting output of the modulated light field shown in FIG. 2A after passing through a second wavelength dependent mask in the imaging system described in FIG. 1. In one example (i.e. the system configuration resulting in output shown in FIG. 2B), the color image capture system outputs spatial color intensity information. In another example (i.e. the system configuration resulting in FIG. 2C), the color image capture system provides both spatial color intensity information and angular information regarding the captured scene. The system configuration that results in the output shown in FIG. 2B provides spatial color information suitable for implementation of a color image camera, for example. While the system configuration resulting in the output shown in FIG. 2C provides both spatial color information and angular information suitable for a color plenoptic camera.

Referring back to our system goals, our goal is to eliminate the color filter array—yet still be able to output from the sensor spatial information about a particular color. If we used a single wavelength dependent mask, for example, we would not get separable spatial information for three primary colors. Instead, the system would provide a combination of angular and spatial information for all colors mixed together such that the system would not be able to separably extract the spatial information for each primary color. Using a single wavelength mask would only let us get the spatial information for the mixture of all colors together (i.e., 202 in FIG. 2A). It is the combination of the two wavelength dependent (first and second wavelength dependent) masks that allows us to not only get spatial, or both spatial and angular information, for all colors mixed together—but to obtain this information separately for each primary color that allows us to eliminate the color filter array.

The properties of the first and second wavelength dependent masks shown in FIG. 1 are related to (a) the position/physical location of the two masks and (b) the attenuation pattern of the two masks. A property of both wavelength dependent masks is that there is a distance between the first and second wavelength dependent masks and the sensor. There needs to be a physical separation between the masks and the sensor in order to determine the angle of the light and angular resolution with respect to the sensor. The distance between the masks and the sensor allows both masks to pass to the sensor angular information that is useful for plenoptic systems. The patterns on the two wavelength dependent masks are co-designed. It is the combination of the two masks that allows the system to obtain angular and spatial color information. The combination of the masks segregates the color spatial information—similar to the function of the color filter array.

Referring to FIG. 1 shows a first wavelength dependent mask 120 and a second wavelength dependent mask 130. Although the mask 120 or 130 could be implemented using a single mask, for purposes of discussion in the example shown in FIG. 1 each of the two wavelength dependent mask is shown as being comprised of two separate mask components—each component dedicated to filtering a single color. For example, the first wavelength dependent mask could be described as being comprised of a first mask component 120*a* and a second mask component 120*b* while the second wavelength dependent mask 130 could be described as being described as being comprised of a first mask component 130*a* and a second mask component 130*a*. In an alternative example, more than two mask components could be used to implement the desired functionality. For example, in one alternative example—three separate mask components could be used. For example, the first wavelength dependent mask could be defined as being comprised of three separate component masks (120*a*, 120*b* and 120*c* (not shown)) where each mask could be dedicated to filtering to pass only a single color (i.e. red, yellow, blue). Alternatively, the two separate aperture mask component 120*a*, 120*b* could be printed on a single mask 120 located at the same physical location and thus the mask components 120*a*, 120*b* would be considered to be a single first wavelength dependent mask.

Referring to FIG. 1, the first and second wavelength dependent masks are wavelength (i.e. color) dependent. For purposes of discussion. we will consider ideal block dye, so that the masks can be considered to act independently. According to the theory described in the article by A. Veeraraghavan, R. Raskar, A. Agrawal, A. Mohan, J. Tumblin entitled "Dappled Photography: Mask Enhanced Cameras for Heterodyned Light Fields and Coded Aperture Refocusing," ACM Transactions on Graphics, Vol. 26, No. 3, Article 69, July 2004, a mask that partially blocks only the complement of a color (i.e. passes yellow to block blue) will only result in modulation in the four dimensional angular-spatial domain, and corresponding Fourier Transform domain for the blocked color. That is, a mask that passes yellow will only cause modulation to blue. To make the affect easier to understand and visualize, for purposes of illustration a collapsed 2D version of the 4D light field is shown with "a" representing the angle axis and "x" representing the spatial axis (thus having Fourier transform domain axis $f_a$ and $f_x$, respectively).

Referring to FIG. 1, to establish notation, the spatial axis (x) is considered to be coincident with the sensor plane (using one dimension for clarity) and the "angle" axis (a) is coincident with the lens. It is important to note that a mask at the "angle" axis is still a spatial mask. The terminology "angle" axis is used because the (a, x) pairs describing a light ray can be used to compute an angle. The angular coordinate (a) is taken a the lens and the "spatial" coordinate (x) is taken at the sensor. Together the "spatial axis" (x) and the "angle axis" (a) provide sufficient information to reconstruct all free-space light rays through the two lines (or two planes in the full 3D case.)

Referring to FIG. 1 shows two wavelength dependent masks. Both the first wavelength dependent mask and the second wavelength dependent mask are comprised of two mask components that attenuate the light field. The yellow mask components (120b, 130b) depict a blue subtractive mask that only affects blue light. The cyan mask components (120a, 130a) depict a red subtractive mask that only affects red light.

The image capture 100 system operates on a light field that has spatial and angular frequency. The first wavelength dependent mask 120 modulates in the angular frequency direction. The second wavelength dependent mask 130 modulates the modulated output of the first wavelength dependent mask along a diagonal line 250 drawn thru the spatial frequency and angular frequency plane. Thus, for the examples shown in FIGS. 2A-2C, the first wavelength dependent mask 120 shifts the color component defined by the first wavelength dependent mask vertically along the angular frequency axis $f_a$, while the second wavelength dependent mask 130 shifts the color component defined by the second wavelength mask along the diagonal line 250 drawn thru the spatial frequency and angular frequency plane. A copy along the diagonal line 250, due to the dye then results in a copy onto the $f_x$ axis, where it can be read by the sensor 114.

Figure 2A:
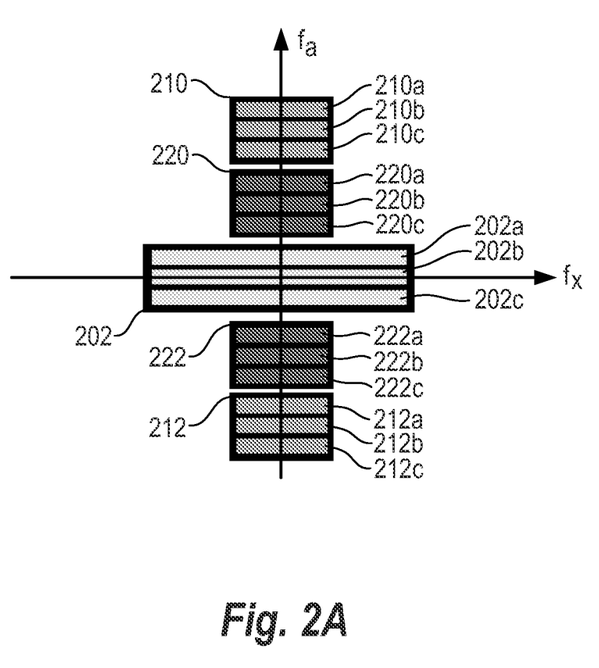
FIG. 2A shows a schematic of a light field after passing through at least a first wavelength dependent mask in the system described in FIG. 1 according to an example of the invention.
Figure 2B:
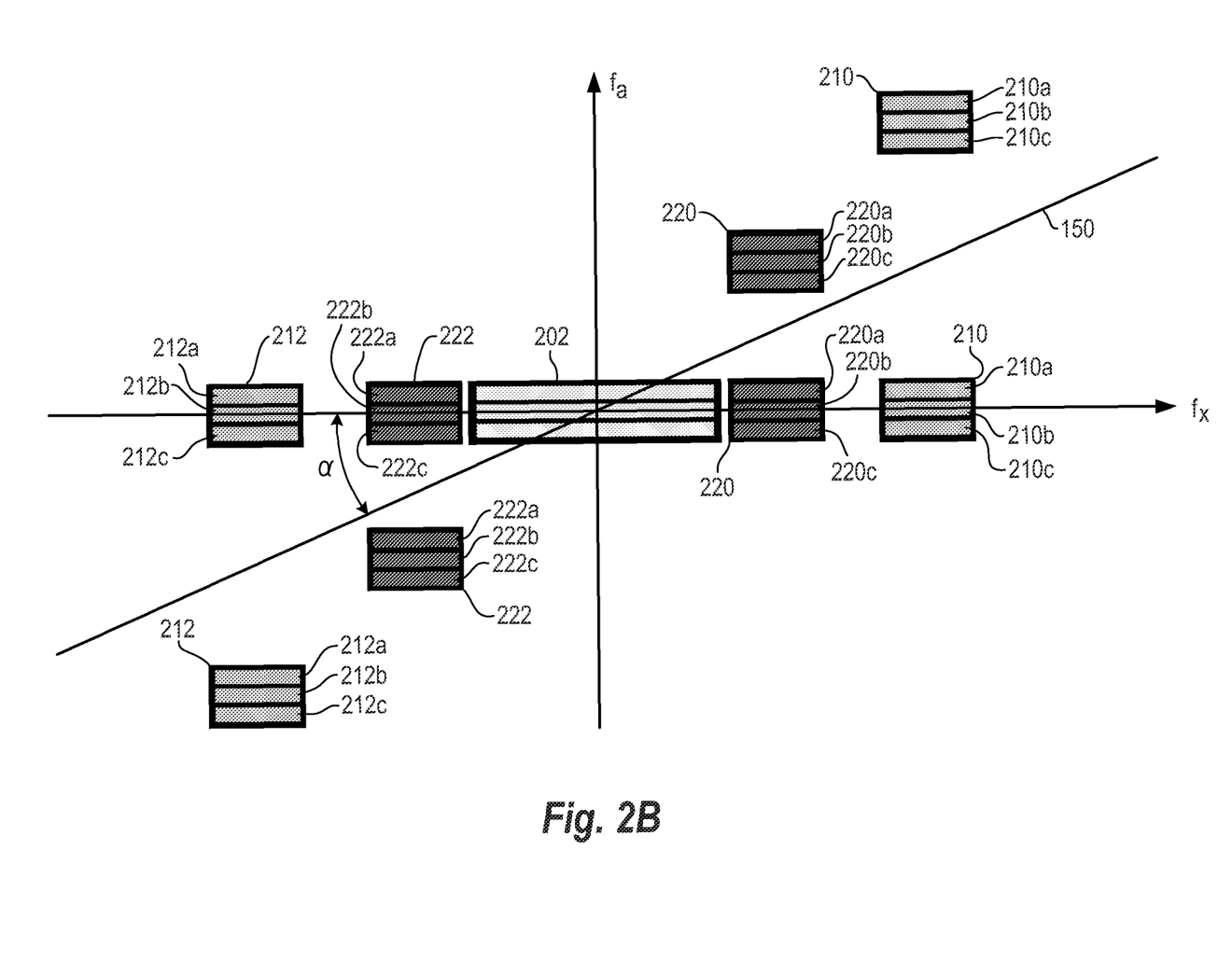
FIG. 2B shows the modulated light field shown in FIG. 2A after passing through a second wavelength dependent mask in the system described in FIG. 1 according to an example of the invention.
Figure 2C:
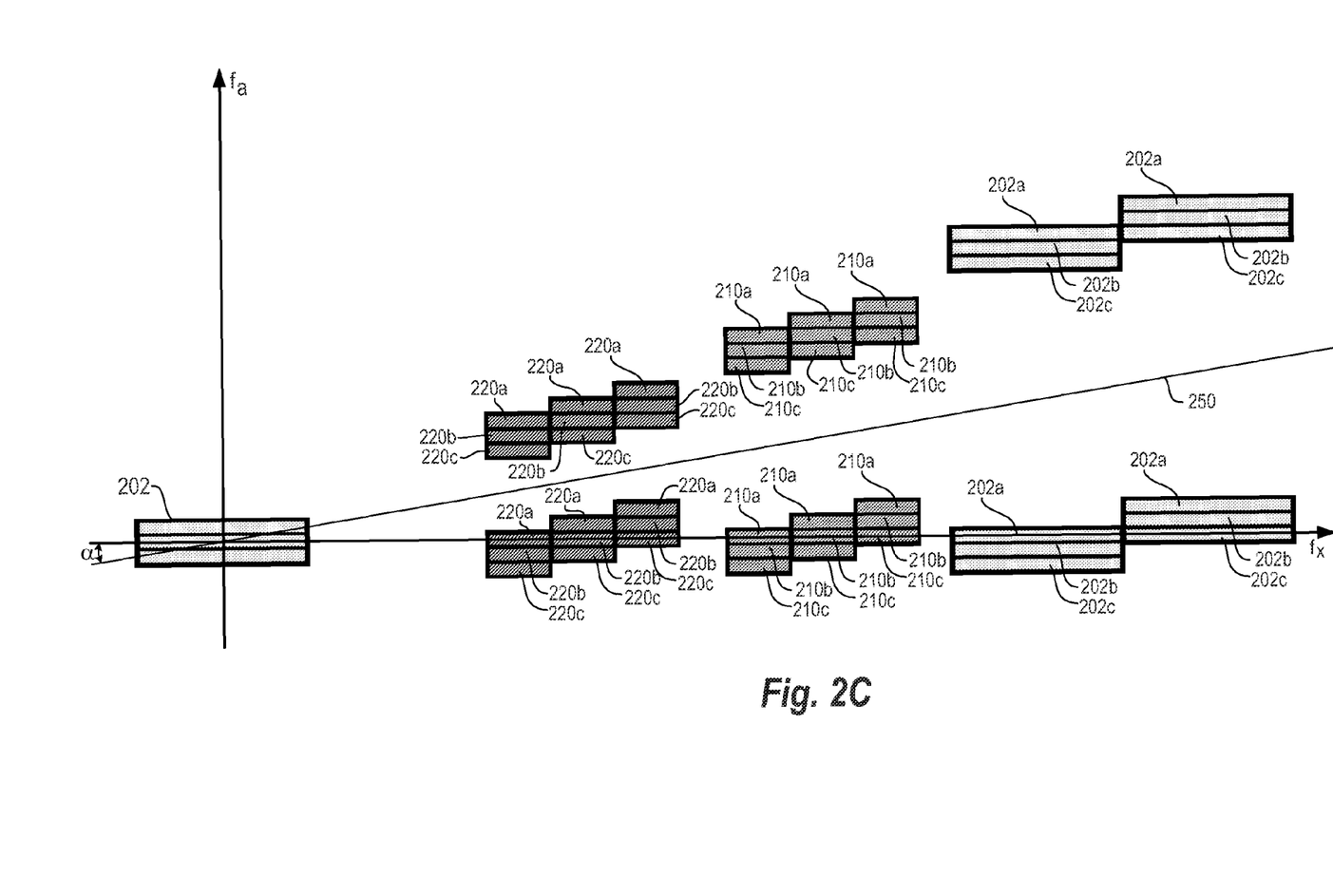
FIG. 2C shows the modulated light field shown in FIG. 2A after passing through a second wavelength dependent mask in the system described in FIG. 1 according to an alternative example of the invention.

FIG. 2A shows the light field after passing through at least a first wavelength dependent mask 120 in the imaging system in the frequency domain. The light shown is plotted along a angular frequency axis $f_a$ and a spatial frequency axis $f_x$. Modulation of the mask placed at the lens aperture is in the angular and spatial frequency domain.

At the lens 110, the light from the scene is composed of angular, spatial and color information. The first wavelength dependent mask 120 takes light from a scene and modulates it via the attenuation pattern of the mask. One of the goals of the image capture system is to eliminate the color filter array. To accomplish this goal, the image capture system uses the combination of masks (120, 130) and post processing after being read by the sensor to separate out the spatial information for each of a set of primary colors. In one example, this is done by frequency domain multiplexing of the color spatial information.

In one example, the mixed spatial color and angular information of the light field is segregated using a Fourier transform. The spatial color information of the scene cannot be extracted using a single mask or by considering only a subset of the pixels, because each pixel sees information from all of the colors. In the Fourier domain, instead of the colors being separated spatially, the components of the light are separated out by frequency.

The first wavelength dependent mask (both pattern and physical position) is designed to produce this separation of color spatial information in the frequency domain. In one example, the mask modulates the light by multiplying the light field by a cosine function. Thus, the first wavelength dependent mask would have a cosine pattern on it that defines the location of the frequency domain impulse functions that occur to produce the desired resultant light field.

In the example shown in FIG. 2A, modulation by the first wavelength dependent mask placed at the lens is in the angular and spatial frequency domain. For the example implementation previously described, a yellow mask 120a (blue subtractive mask) and a cyan mask 120b (red subtractive mask) are defined by the first wavelength dependent mask pattern. If we place one color-dependent, spatially modulated mask at the lens, we can modulate color in the $f_a$ dimension only. This is depicted in FIG. 2A for both the red and blue colors light field blocks (210, 212, 220, 222.)

Referring to FIG. 2A, the light field block 202 is representative of the mixed color all colors combined together additively) light at the sensor. The blue color of the scene is shifted up and/or down in angular frequency by the first wavelength dependent mask pattern 120a (a yellow spatially modulated cosine mask) and represented by blue light field blocks 210 and 212. The red color is shifted up and down (by a first wavelength dependent mask pattern 120b) to a lesser amount in this particular example by a cyan spatially modulated cosine mask (spatial cosine of a lower frequency) and is represented by the red light field slices 220a and 220b. Because we want to get angular resolution with respect to each color segregated, in one example we pull out the red and blue color components separately.

In FIGS. 2A-2C, each light field block is divided into three sections or slices that are representative of the angular and spatial color information of the light field. Two of the three slices (for example for the red light filed block 210, slices 210a and 210c)—the upper and lower slices of the light field block contain both angular and spatial color information. One of the three slices (for example for the red light field block 210, slice 210b)—the middle slice or "baseband" of the light field block contains color spatial information. For the gray light field block 202, the middle slice 202b is representative of the color spatial information that can be measured by the sensor on the $f_x$ axis.

In the example shown in FIG. 2A, the angular information for a particular colors is discussed with red and blue colors. However in one example, other colors (or color ranges) could be chosen. What is desirable is that the chosen colors should provide coverage for the captured image for the desired color spectrum—typically the visible light spectrum.

In the described implementation, the at least two wavelength dependent masks 120, 130 are co-designed. The masks should be co-designed so that the pattern and position of the at least two masks perform a series of modulations (or steps) necessary to achieve the imaging system goals. For example, the goal of removing the color filter array is not achieved using a single mask, but with at least two masks. The first wavelength dependent mask 120 segregates the colors along the angular frequency axis. The second wavelength dependent mask modulates a select portion of the segregated copy on the angular frequency axis to the spatial frequency axis so that the select portion of the copy can be read by the sensor.

Although the patterns of the two masks are different, the functions they perform must be coordinated—so the masks should be co-designed. For the system and method described, the spatial patterns on the two wavelength dependent masks should produce a combined effect to copy the desired information onto the $f_x$ axis. Further, because the second mask takes the shifted copy of the color along the angular frequency axis and shifts it to the spatial frequency axis—in one example, the colors modulated on the two wavelength dependent masks are the same.

Note that the at least two color-dependent masks 120, 130 located between the lens and sensor, do not need to be co-located. The placement of the mask defines the angle alpha of the line in FIGS. 2B and 2C. FIG. 2B shows the modulated light field shown in FIG. 2A after passing through a second wavelength mask 130 in the system described in FIG. 1. FIG. 2C shows the modulated light field shown in FIG. 2A after passing through a second wavelength dependent mask in the system described in FIG. 1. Referring to FIG. 1, the angle alpha (and thus the slope of the diagonal line 250 shown in FIGS. 2B and 2C) is proportional to the ratio of the distance p (the distance between the first wavelength dependent mask and the second wavelength dependent mask 130), divided by the sum of q (the distance between the sensor and the second wavelength dependent mask 146)+p.

Referring to FIG. 2A shows the representative of the light field (in the frequency domain. The light field block 202 is referred to as being gray in color as it contains blue, green and red color components. The baseband 202b of the gray component is on the $f_x$ or sensor axis and the light intensity in this region can be measured by the sensor. However, because the red, green and blue color components are mixed in light field block 202, the image capture system cannot distinguish between the red, blue and green color components of the dye 202.

Referring to FIG. 2A, the copies of the light field block for the red and blue components of the light field are located on the angular frequency axis $f_a$. However, the only color intensity data that can be read is on the $f_x$. Because the color intensity information for the blue and red components cannot be read—this first masking step does not have value in isolation. It is the combination of the first wavelength dependent mask and the second wavelength dependent mask that provides the information regarding color intensity for the separate red and blue color components. It is the additional masking step which allows for the elimination of the color filter array.

The masking step by the second wavelength dependent mask 130 the color or spatial component of the light field shown in FIG. 2A onto the spatial frequency axis so that the intensity for each color component can be measured. As previously stated, the first wavelength dependent mask moves the color light field blocks in the vertical direction along the angular frequency axis. The second wavelength dependent mask moves the color light field blocks along a diagonal drawn in the spatial frequency and angular frequency plane. The second mask takes the result of the modulation from the first mask in inputs this result to the second wavelength dependent mask. The result of the application of the second mask is to modulate the light along the diagonal 250 to an allocated interval along the spatial frequency axis where no other data is written. The shifted result is copied onto an area on the spatial frequency axis where other data is not written. Because the color intensity for the red and blue components can be read—in effect we can replicate the color filter array.

Referring to FIGS. 2B and 2C, since the light field block 202 is a combination of all three primary colors, we do not necessarily need a green mask to replicate the color filter array. The green baseband can be recovered from the middle "gray" region of the light field block 202b since we know the contributions from each of the three colors, while two colors (red and blue) are known due to their modulation. This also allows the baseband region to have higher spatial resolution, as depicted by the wider rectangles of the mixed color light field block 202 compared to the red and blue light field block (210, 212, 220, 222) shown in FIGS. 2A-2C. Also, if the red and blue angular dependence can be considered correlated to the green, we could infer the green angular dependence from red and blue. Otherwise, we would use a single green mask located between the lens and sensor.

Referring to FIGS. 2B and 2C, we are not just frequency multiplexing the color spatial information—we are also frequency multiplexing angular information. The methods used for taking the slice along $f_x$ for $f_a=0$ and recombining into the original $f_x$, $f_a$ transform data are not described in detail. However, one method of achieving this data transformation is described in the article by A. Veeraraghavan, R. Saskar, A. Agrawal, A. Mohan, J. Tumblin entitled "Dappled Photography: Mask Enhanced Cameras for Heterodyned Light Fields and Coded Aperture Refocusing," ACM Transactions on Graphics, Vol. 26, No. 3, Article 69, July 2004 which is incorporated herein by reference.

By placing a second mask of the same wavelength dependence (and possibly different spatial modulation) close to the sensor, we can further modulate that color so that we can sample the plenoptic function on the spatial frequency $f_x$ axis. This is depicted in FIGS. 2B and 2C. In one example, the function patterned on the second wavelength dependent mask results in the two different light field outputs shown in FIGS. 2B and 2C. The mask that results in the output shown in FIG. 2B is suitable for use, for example, in a non-plenoptic color camera. The mask that results in the output shown in FIG. 2C is suitable for use, for example, in a plenoptic color camera.

Referring to FIG. 2B shows an output field relevant for designing a color non-plenoptic camera. Two masks are utilized (one at the lens, the other a distance d from the sensor) to achieve measurement of the color intensity value at each sensor position. The second mask takes the output field of FIG. 2A and moves copies of the red and blue components along the diagonal. Copies of the red and blue components are moved from along the diagonal to the spatial frequency axis $f_x$. In the example shown in FIG. 2B, only the middle component (spatial information-color intensity) is copied to the $f_x$ axis. Thus, in this example, no angular information can be read. Thus, the output is suitable for a non-plenoptic color camera, not a color plenoptic camera. The described implementation removes the need for a color filter array (i.e. a Bayer pattern) and the demosaicing associated with the Bayer pattern while achieving a higher transmission of light.

FIG. 2C shows the result of passing the modulated light field shown in FIG. 2A through a second mask according to an example of the invention. In the non-plenoptic camera case shown in FIG. 2B—the color spatial information is copied onto the spatial frequency axis and it's the combination of the two wavelength dependent masks that allow the separation for each color. For the example shown in FIG. 2C, both the spatial information and angular information are copied to the $f_x$ axis. Thus, the output is suitable for implementing a plenoptic color camera. However, for the case shown in 2C, the mask then would include enough cosine components at different (but specific) frequencies to provide copies to sample angular frequency information as well.

Similar to the example shown in FIG. 2B, the second wavelength dependent mask used to produce the output shown in FIG. 2C—takes the output field of FIG. 2A and modulates copies of the red and blue components along the diagonal 250. Copies of the red and blue components are modulated from along the diagonal to the spatial frequency axis $f_x$. However, in contrast to the implementation shown in FIG. 2B where only the spatial color information is copied to the $f_x$ axis, in the example shown in FIG. 2C—the angular information is also copied to the $f_x$ axis. To accomplish this, both angular components (220a, 220c; 210a, 210c and 202a, 202c) must be copied to the f axis.

For purposes of illustration, only the upper right quadrant is shown in FIG. 2C. Referring to FIG. 2C, the angular information (upper and middle regions of the light field block) is copied $f_x$ axis for each light field block 220, 210, 202. For each light field block, a copy of the angular and color information is shifted to the $f_x$ axis so that both the color and angular information can be read. For the output from FIG. 2A, this would result in three copies each of the red and blue copies of the light field block (210, 220) on the $f_x$ axis, so we can obtain the slices a, b, and c for each light field block. Since the middle slice of the gray light field block 202 can already be read at the origin, only two copies of the gray light field block 202 (the upper and lower regions 202a and 202c) need to be copied in order to read the angular and frequency information.

In order to compare the amount of light reaching the sensor on average for our design versus a Bayer color filter design, a rough computation can be done assuming block light field blocks. Because only a single color reaches any individual pixel in the color filter case, only 33% of the available light is used. In our case, if no green modulation is required then green is fully passed, and each mask blocking red and blue removes 50% of 33% (the 50% is due to the spatial cosine modulation having a DC component.) This results in the total light reaching the sensor at (33%+33%×0.5×0.5+33%×0.5× 0.5) 50%, which is much better than the color filter array.

If the mask modulating green is also used to obtain green-specific angular information then we lose an additional half of 33% with the overall average transmission of (50%−33%× 0.5) 33%. This is the same as a conventional camera using a color filter array, but we are able to obtain the additional angular information (at some loss in spatial resolution.) Further, by refocusing after capture we are able to use a wider aperture for the same depth of field and allow even more light to reach the sensor.

Figure 3A:
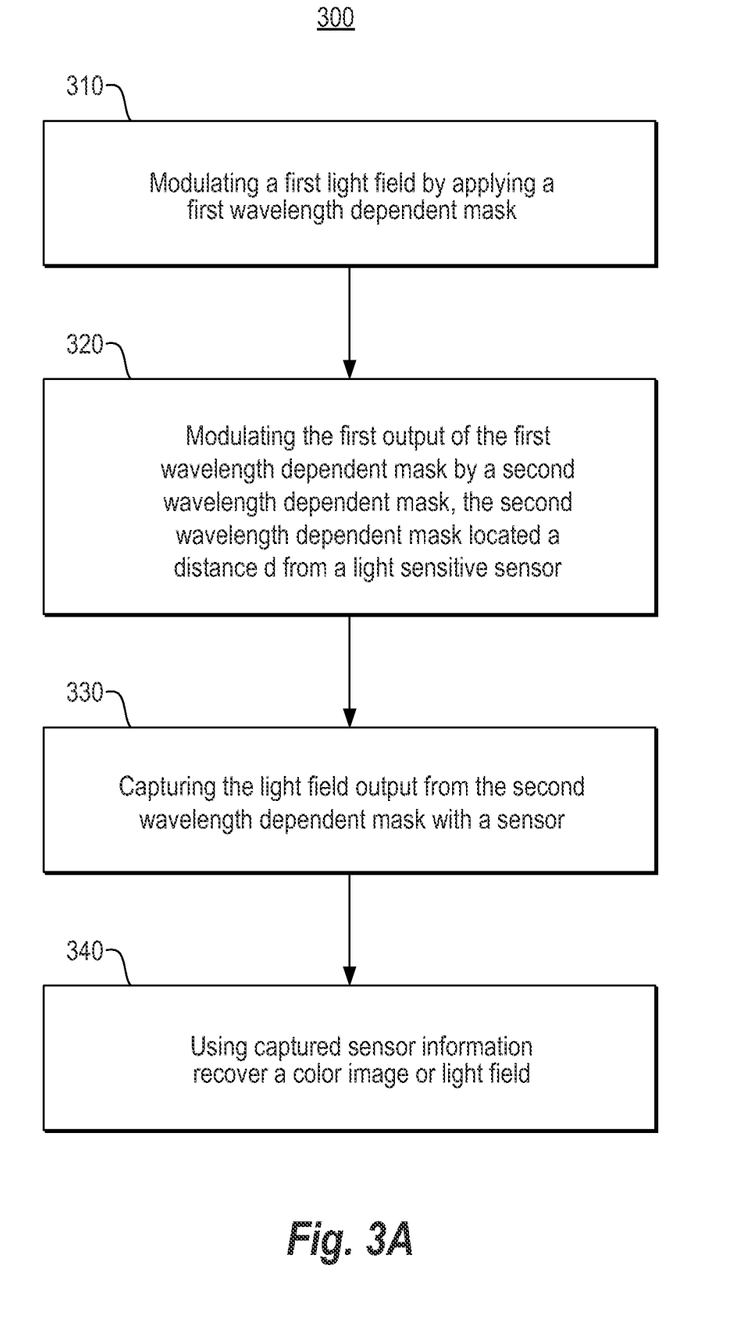
FIG. 3A shows a flow diagram for a method of modulating the light field according to an example of the invention.

FIG. 3A shows a flow diagram for a method of modulating the light field according to an example of the invention. Referring to FIG. 3 shows the steps of: modulating a first light field captured by a lens by applying a first wavelength dependent mask 120 (step 310) located at the principal plane 124 of the lens on an optical path 128 between the lens and sensor, wherein the first wavelength dependent mask 120 includes a first attenuation pattern for modulation of a light field; and modulating the output of the first wavelength dependent mask with a second wavelength dependent mask (step 320) that includes a second attenuation pattern to modulate the modulated light field from the first wavelength dependent mask, the second wavelength dependent mask located on the optical path 128 between the first wavelength dependent mask and the sensor, further wherein the second wavelength dependent mask is separated from the sensor by a distance d.

After the step of modulating the output of the first wavelength dependent mask with a second wavelength dependent mask (step 320), the resultant light field is captured by the sensor 114 (step 330). The computing device coupled to the sensor 114, then uses the sensed data to determine at least the image color for each pixel in the captured image. In one example, the image color is determined using the sensed color spatial information and plenoptic function information. In one example, the color spatial information and plenoptic function information (i.e. angular data) is determined using a Fourier transform.

Figure 3B:
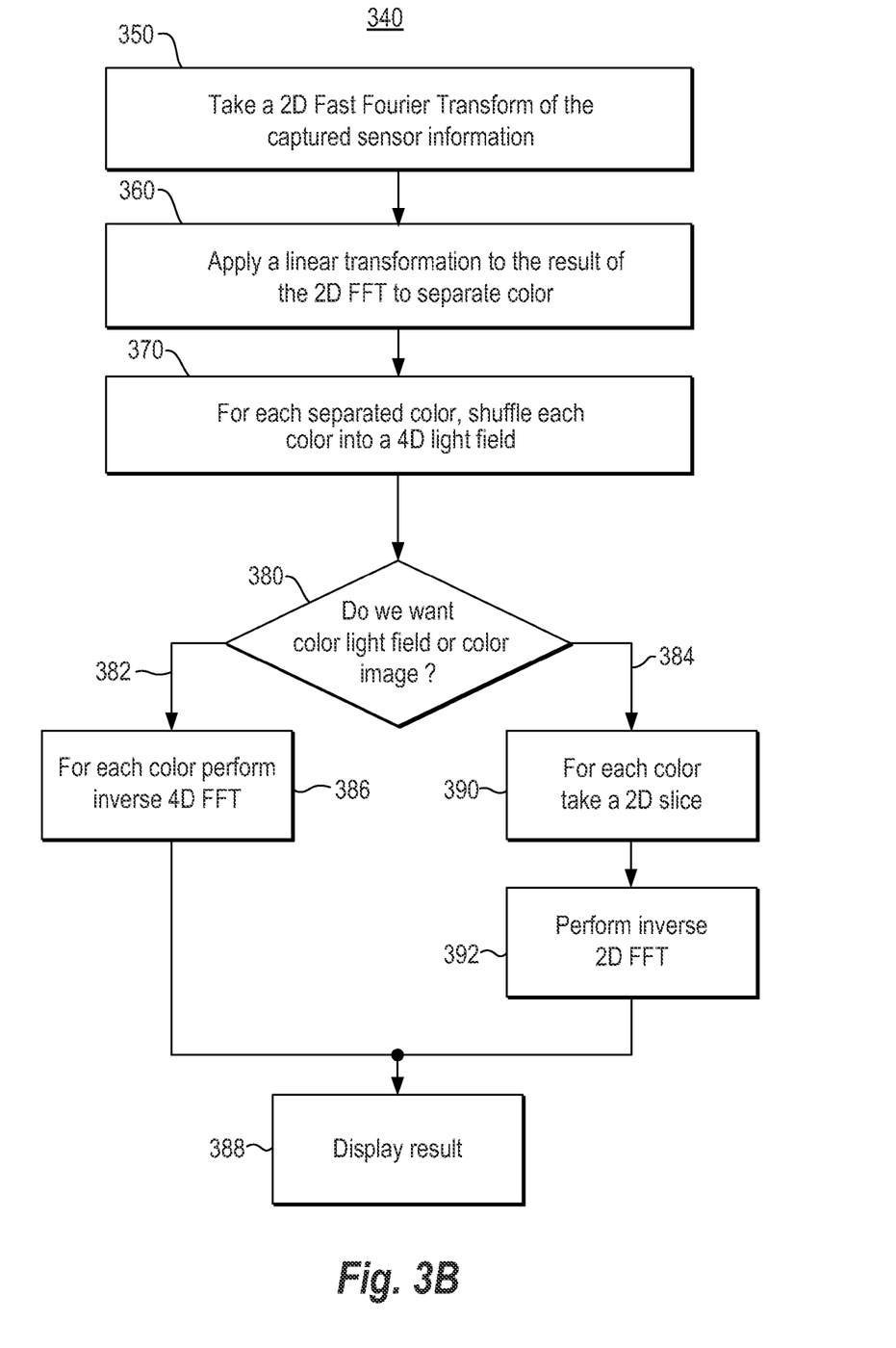
FIG. 3B shows a flow diagram for a method for recovering data captured by the sensor according to an example of the invention.

After the light field output from the second wavelength dependent mask is captured by the light sensitive sensor, the sensed information is used to recover the color image (step 340). Although many methods may be used to recover the captured image, FIG. 3B shows a flow diagram for one method of recovering data captured by the sensor according to an example of the invention. According to the example shown in FIG. 3B, the sensed information (data captured at the light sensitive sensor 114) is recovered by first taking a 2D Fast Fourier Transform (FFT) of the captured sensor information (step 350). Next, a linear transform is applied to the result of the 2D FFT to separate the captured sensor information into separate colors (step 360). Next, for each separated color, the result of the linear transform is shuffled (or demodulated from the sensor slice) (step 370) according to the methods described in the article by A. Veeraraghavan, R. Saskar, A. Agrawal, A. Mohan, J. Tumblin entitled "Dappled Photography: Mask Enhanced Cameras for Heterodyned Light Fields and Coded Aperture Refocusing," ACM Transactions on Graphics, Vol. 26, No. 3, Article 69, July 2004.

In one example, a determination is made as to whether a color light field or color image output is desired (step 380). If a color light field is desired (step 382), then for each separated color, an inverse 4D Fast Fourier transform is performed (step 386). If a color light field image is desired, then for each separated color a 2D slice is taken (step 390) and an inverse 2D Fast Fourier transform is performed on the 2D slice. In both cases (step 382 or 384), the resultant color image or light filed is displayed (step 388).

Figure 4:
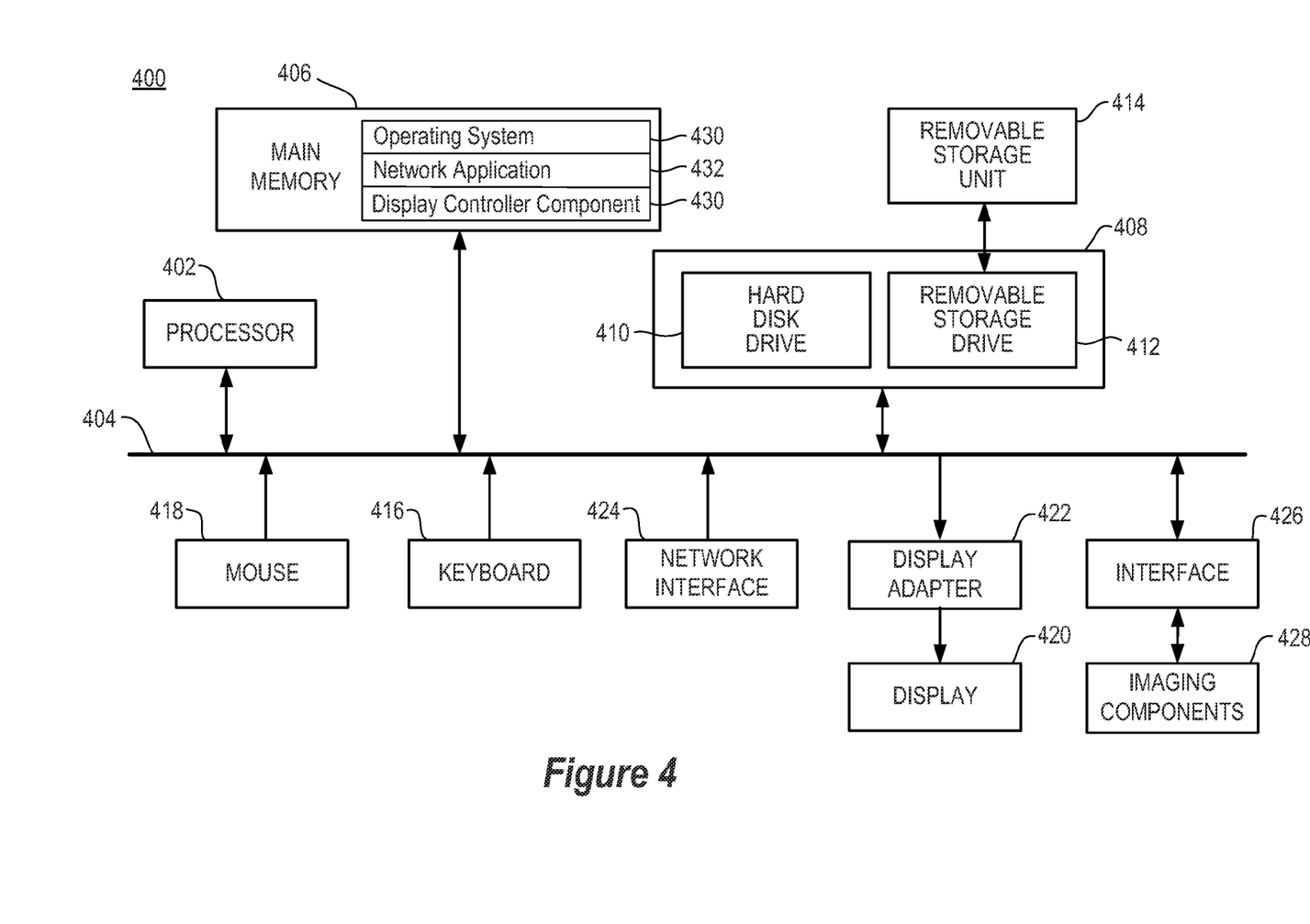
FIG. 4 shows a computer system for implementing the method shown in FIGS. 3A and 3B and described in accordance with examples of the present invention.

FIG. 4 shows a computer system for implementing the methods shown in FIGS. 3A and 3B and described in accordance with embodiments of the present invention. It should be apparent to those of ordinary skill in the art that the method 300 represents generalized illustrations and that other steps may be added or existing steps may be removed, modified or rearranged without departing from the scopes of the method 300. The descriptions of the method 300 are made with reference to the system 100 illustrated in FIG. 1 and the system 400 illustrated in FIG. 4 and thus refers to the elements cited therein. It should, however, be understood that the method 300 is not limited to the elements set forth in the system 400. Instead, it should be understood that the method 300 may be practiced by a system having a different configuration than that set forth in the system 400.

Some or all of the operations set forth in the method 300 may be contained as utilities, programs or subprograms, in any desired computer accessible medium. In addition, the method 300 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

FIG. 4 illustrates a block diagram of a computing apparatus 400 configured to implement or execute the method 300 depicted in FIG. 3, according to an example in this respect, the computing apparatus 400 may be used as a platform for executing one or more of the functions described hereinabove with respect to the computing device 140.

The computing apparatus 400 includes one or more processor(s) 402 that may implement or execute some or all of the steps described in the method 600. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard drives 410 and/or a removable storage drive 412, representing a removable flash memory card, etc., where a copy of the program code for the method 400 may be stored. The removable storage drive 412 reads from and/or writes to a removable storage unit 414 in a well-known manner.

These methods, functions and other steps described may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any interfacing device and/or system capable of executing the functions of the above-described examples are encompassed by the present invention.

Although shown stored on main memory 406, any of the memory components described 406, 408, 414 may also store an operating system 430, such as Mac OS, MS Windows, Unix, or Linux; network applications 432; and a display controller component 430. The operating system 430 may be multi-participant, multiprocessing, multitasking, multithreading, real-time and the like. The operating system 430 may also perform basic tasks such as recognizing input from input devices, such as a keyboard or a keypad; sending output to the display 420; controlling peripheral devices, such as disk drives, printers, image capture device; and managing traffic on the one or more buses 404. The network applications 432 includes various components for establishing and maintaining network connections, such as software for implementing communication protocols including TCP/IP, HTTP, Ethernet, USB, and FireWire.

The computing apparatus 400 may also include an input devices 416, such as a keyboard, a keypad, functional keys, etc., a pointing device, such as a tracking ball, cursors, mouse 418, etc., and a display(s) 420. A display adaptor 422 may interface with the communication bus 404 and the display 420 and may receive display data from the processor 402 and convert the display data into display commands for the display 420.

The processor(s) 402 may communicate over a network, for instance, a cellular network, the Internet, LAN, etc., through one or more network interfaces 424 such as a Local Area Network LAN, a wireless 402.11x LAN, a 3G mobile WAN or a WiMax WAN. In addition, an interface 426 may be used to receive an image or sequence of images from imaging components 428, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents:

What is claimed is:

1. A color image capture system comprised of:
   a lens;
   a light sensitive sensor;
   a first wavelength dependent mask located on an optical path between the lens and sensor, wherein the first wavelength dependent mask includes a first attenuation pattern for modulation of a light field; and
   a second wavelength dependent mask,
   wherein the second wavelength dependent mask includes a second attenuation pattern to modulate the modulated light field from the first wavelength dependent mask, the second wavelength dependent mask located on the optical path between the first wavelength dependent mask and the sensor,
   wherein the second wavelength dependent mask is separated from the sensor by a distance, and
   wherein the first wavelength dependent mask or the second wavelength dependent mask performs color spatial frequency multiplexing in a Fourier domain.

2. The color image capture system recited in claim 1 wherein the light field output from the second wavelength dependent mask is sensed by the light sensitive sensor and used to determine the color spatial information for each pixel in the image.

3. The color image capture system recited in claim 1 wherein the light field output from the second wavelength dependent mask is sensed by the light sensitive sensor and used to determine the color spatial intensity information and plenoptic function information.

4. A method of providing a color image:
   modulating a first light field captured by a lens by applying a first wavelength dependent mask located on an optical path between the lens and sensor, wherein the first wavelength dependent mask includes a first attenuation pattern for modulation of a light field to provide an output; and
   modulating the output with a second wavelength dependent mask that includes a second attenuation pattern to modulate the modulated light field from the first wavelength dependent mask, the second wavelength dependent mask located on the optical path between the first wavelength dependent mask and the sensor,
   wherein the second wavelength dependent mask is separated from the sensor by a distance,
   capturing the resultant light field by the sensor to generate sensor information including color spatial information; and
   determine at least the image color for each pixel in a captured image based on the color spatial information.

5. The method recited in claim 4 further including the step of: using the sensed information to recover a color image or light field.

6. The method recited in claim 4 wherein the sensed information further includes plenoptic function information.

7. The method recited in claim 5, wherein the step of recovering a color image or light field includes the steps of taking a 2D FFT of the captured sensor information, applying a linear transform of the 2D FFT to separate color, for each separated color shuffling each color into a 4D light field and performing an inverse FFT.

8. A non-transitory computer readable storage medium having computer readable program instructions stored thereon for causing a computer system to perform:

cause modulation of a first light field captured by a lens by applying a first wavelength dependent mask located on an optical path between the lens and a sensor, wherein the first wavelength dependent mask includes a first attenuation pattern for modulation of a light field; and cause modulation of an output of the first wavelength dependent mask with a second wavelength dependent mask that includes a second attenuation pattern to modulate the modulated light field from the first wavelength dependent mask, the second wavelength dependent mask located on the optical path between the first wavelength dependent mask and the sensor, wherein the second wavelength dependent mask is separated from the sensor by a distance, capture the resultant light field by the sensor to determine sensed information, wherein the sensed information includes color spatial information; and use the color spatial information to determine at least the image color for each pixel in the captured image.

9. The computer readable storage medium recited in claim 8 wherein the sensed information further includes plenoptic function information.

\* \* \* \* \*